United States Patent [19]
Law et al.

[11] 3,817,651

[45] June 18, 1974

[54] CONTROL SYSTEM HAVING MEANS FOR EXPANDING THE USEFUL FREQUENCY RESPONSE

[75] Inventors: John Law, Manlius; Donald E. Neill, Liverpool, both of N.Y.

[73] Assignee: Carrier Corporation, Syracuse, N.Y.

[22] Filed: Apr. 20, 1973

[21] Appl. No.: 353,057

[52] U.S. Cl............................ 415/1, 415/30, 415/36
[51] Int. Cl............................................... F01d 1/00
[58] Field of Search............................. 415/1, 30, 36

[56] References Cited
UNITED STATES PATENTS
| | | | |
|---|---|---|---|
| 3,446,224 | 5/1969 | Zwicky, Jr. | 415/1 |
| 3,572,959 | 3/1971 | Shaughnessy | 415/30 |

*Primary Examiner*—C. J. Husar
*Attorney, Agent, or Firm*—J. Raymond Curtin; Frank N. Decker, Jr.

[57] ABSTRACT

A control system for a steam turbine includes a speed sensor providing a signal to actuate a monostable multivibrator. The output from the multivibrator is integrated and conditioned to control the fluid flow through the turbine. When the integrated output from the multivibrator reaches a predetermined magnitude, a feedback signal is provided to vary the current passing to the multivibrator in a manner which reduces the duration of the output pulses therefrom, so that the useful input frequency response of the multivibrator is expanded. Two means of establishing the turbine speed are disclosed wherein a manual setpoint signal is summed with a function of the control signal output from the multivibrator to provide an error signal, and a process control signal may additionally be employed to vary the current supplied to the multivibrator to produce a corresponding variation in the output pulse duration thereof and a corresponding variation in the error signal magnitude.

9 Claims, 2 Drawing Figures

CONTROL SYSTEM HAVING MEANS FOR EXPANDING THE USEFUL FREQUENCY RESPONSE

BACKGROUND OF THE INVENTION

This invention relates to a control system for machinery, such as a steam turbine, of a type wherein a speed sensor provides a signal having a frequency corresponding to the speed of the turbine to a monostable multivibrator. A monostable multivibrator normally provides an output pulse of constant duration which is triggered by each cycle of the speed signal. The output from the multivibrator may then be integrated, conditioned and supplied to an actuator to adjust fluid flow through the turbine.

A problem exists, however, if the speed of the turbine exceeds the speed range over which the multivibrator is designed to operate.

The input of a monostable multivibrator can only be triggered when its output stage has turned off and is not producing an output pulse. Consequently, the input frequency response of this type of multivibrator is limited by the duration of the output pulse therefrom. In a device such as a turbine speed control, the control system may properly control the turbine up to the point where the input frequency response of the multivibrator is exceeded by the speed signal frequency. When the input pulses to the multivibrator begin arriving faster than the rate at which the multivibrator can respond, the result is a sharp decrease in multivibrator output which has the effect of falsely indicating a drop in turbine speed when, in fact, the turbine is rotating at an excessively high speed. Consequently, the control can no longer function to maintain the desired turbine speed until the turbine slows down for some other reason sufficiently that the input signal of the multivibrator is again below the input frequency response of the multivibrator.

SUMMARY OF THE INVENTION

It is an object of this invention to provide a speed control system employing a monostable multivibrator having feedback means associated therewith to prevent a decrease in output from the multivibrator during periods of time when its input frequency response is exceeded.

In accordance with this invention, a speed sensor provides a speed signal having a frequency which is a function of the speed of the machine being controlled. The speed signal is employed to trigger a monostable multivibrator, the output of which is employed to control, through suitable means, the speed of the machine. A feedback signal which is a function of the speed of the machine being controlled is fed to the current source for the multivibrator in a manner so as to vary the pulse width of the multivibrator output to expand the range of input frequencies to which the multivibrator can usefully respond. Preferably, the feedback signal is passed through a level detector and supplied to the current source in a manner to provide a variation in the duration of the output pulse from the multivibrator during periods of time when the machine speed is relatively high and approaching a speed which would result in a speed signal frequency which exceeded that to which the multivibrator can reliably respond.

Means are also provided for maintaining a desired machine speed by summing a setpoint signal with a function of the output of the multivibrator to produce an error signal. The error signal of the multivibrator to produce an error signal. The error signal may also be modified by varying the output pulse duration from the multivibrator in response to a desired condition of operation of the machine.

DESCRIPTION OF THE PREFERRED EMBODIMENT

Figure 1:
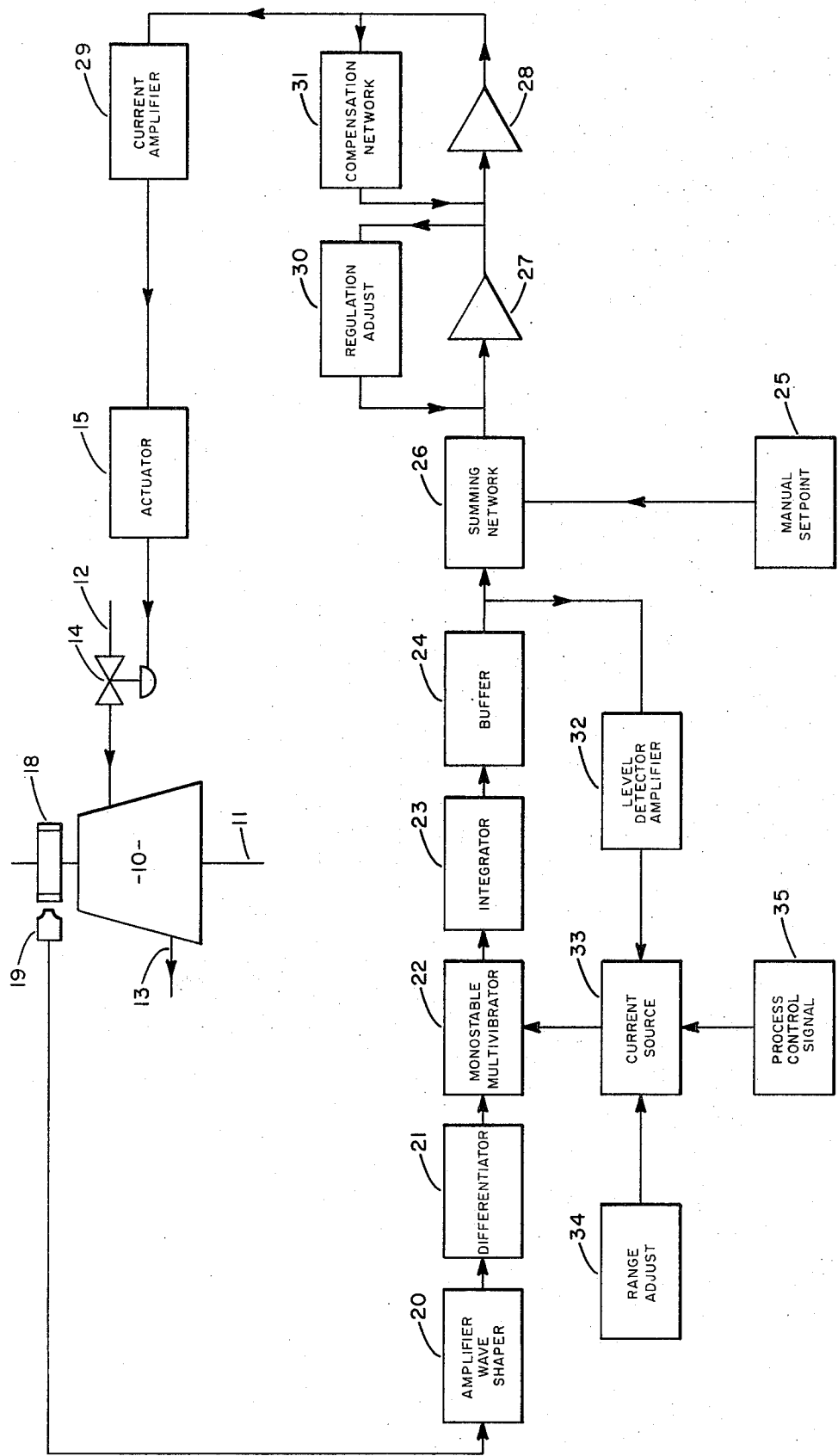
FIG. 1 is a block diagram representing the functions of a control system for a steam turbine embodying the present invention.

A steam turbine 10, connected to drive shaft 11, is provided with a steam inlet passage 12 and outlet passage 13. A steam control valve 14, positioned by actuator 15, controls the passage of fluid through turbine 10. Actuator 15 is preferably of the electropneumatic type which includes a pneumatic actuator and an electropneumatic transducer, although other types of actuators may be employed, depending on the type of machine being controlled and the control mechanism therefor.

Shaft 11 carries a toothed wheel 18 which passes in the field of electromagnetic speed sensor 19. Speed sensor 19 produces an AC speed signal having a frequency which is a direct function of the speed of shaft 11.

The speed signal from sensor 19 passes through an amplifier/wave shaper 20 which converts the AC sign wave speed signal to an amplified square wave signal of the same frequency. The output from wave shaper 20 is supplied to differentiator 21 which converts the square wave speed signal to a speed signal comprising series of spiked pulses of a frequency which is a function of the speed of turbine 10.

The speed signal from differentiator 21 is supplied to a monostable multivibrator 22 to trigger the multivibrator. Multivibrator 22 produces an output pulse of substantially constant amplitude and normally constant time duration upon the occurrence of a spike or pulse at its input. Monostable multivibrators, after producing an output pulse, return back to their stable or quiescent state after which they can again be triggered on the occurrence of another input pulse. As previously explained, such multivibrators have an inherent input frequency limitation due to the fact that they can only be triggered to produce an output pulse during periods of time when they have returned to the quiescent state. Consequently, if the speed signal input to the multivibrator has a frequency so high that a second input pulse arrives during the period of time that an output pulse is being produced, the multivibrator will ignore the second input pulse and its output pulses will no longer to a reliable indication of the machine speed.

The control signal output pulses from multivibrator 22 are supplied to integrator 23 which integrates the output pulses to produce a DC voltage control signal which is a function of the speed of turbine 10, provided the input capabilities of the multivibrator have not been exceeded. The control signal output from integrator 23 is supplied to a buffer stage 24.

A manual setpoint circuit 25 is provided so that the operator can manually determine the desired speed of operation of turbine 10 by a suitable control which produces a manual setpoint signal which is a function of the desired speed. The manual set-point signal is preferably a DC voltage of opposite polarity to that of the control signal output from buffer 24.

Summing network 26 compares the setpoint and control signals and provides an error signal to operational amplifiers 27 and 28 which is a function of the difference between the manual setpoint speed and the operating speed of turbine 10. An adjustable regulation network 30 is provided to control the feedback signal around amplifier 27. Regulation network 30 is adjusted to provide the amplification of the error signal required by actuator 15 to provide the required amount of change of value opening valve 14 for a given amount of change in the turbine speed. In effect, operational amplifier 27 controls the sensitivity of the circuit to errors in turbine speed. Compensation network 31 controls the amount of feedback around amplifier 28 and contains various frequency sensitive networks to match the various factors which can cause phase shifts at particular operating frequencies so that the characteristics of the control system are matched to the lags present in the characteristics of turbine 10, valve 14 and actuator 15. The conditioned error signal output from amplifier 28 is supplied to a current amplifier 29 which provides an error current signal to electropneumatic actuator 15 for adjustment of valve 14.

In accordance with this invention, a feedback network is provided to extend the range of input frequencies within which multivibrator 22 is capable of providing a useful output for control of the turbine. For this purpose, a feedback signal, comprising the control signal output of buffer 24, is passed to the input of level detector-amplifier circuit 32. It will be observed that the feedback signal is a function of the speed of turbine 10. When the feedback signal is below a predetermined magnitude, determined by level detector 32, the feedback has no effect on the control system. However, when the feedback signal reaches a predetermined magnitude, indicative of a relatively high turbine speed which would produce a speed signal having a frequency which exceeds the input frequency capabilities of multivibrator 22, the feedback signal is then supplied to current source 33.

Current source 33 provides the current for operation of multivibrator 22. The duration of the output pulses from multivibrator 22 is a function of the magnitude of the input current supplied to the multivibrator. When the level of the feedback signal exceeds the level set by level detector 32, the feedback signal is provided to current source 33 which varies the current supplied to multivibrator 22 in a manner such as to reduce the duration of the output pulses therefrom. Consequently, because the output pulses from the multivibrator have been shortened, the input recovers or assumes a stable state in a lesser period of time and is therefore sooner able to respond to the presence of another input pulse. Consequently, the multivibrator will continue to produce an output pulse for each input pulse supplied thereto. Consequently, the integrated value of the output of the multivibrator, which forms the control signal, will continue to have a high level, indicative of the overspeed condition. Stated in another way, the useful input frequency response of the multivibrator has been increased and because the multivibrator will respond to an increased frequency of input pulses, the integrated value of the multivibrator output pulses will still reliably indicate the overspeed condition. Therefore, the control signal will indicate the overspeed condition and will produce a sufficient error signal to reduce the fluid flow through the turbine.

A range adjustment network 34 is provided to adjust the operating speed range of the control system by varying the normal current output from current source 33 to multivibrator 22. Similarly, a process setpoint control signal input 35 is provided to current source 33 so that the speed of turbine 10 can be regulated by an externally generated process setpoint control signal which modifies the control signal by shortening or lengthening the duration of the output pulse from the multivibrator in accordance with a function of a desired speed. It will be apparent that varying the duration of the output pulses for multivibrator 22 varies the magnitude of the control signal produced by integrator 23 and consequently is effective to provide an error signal to actuator 15 when integrated and summed with the manual setpoint signal.

Figure 2:
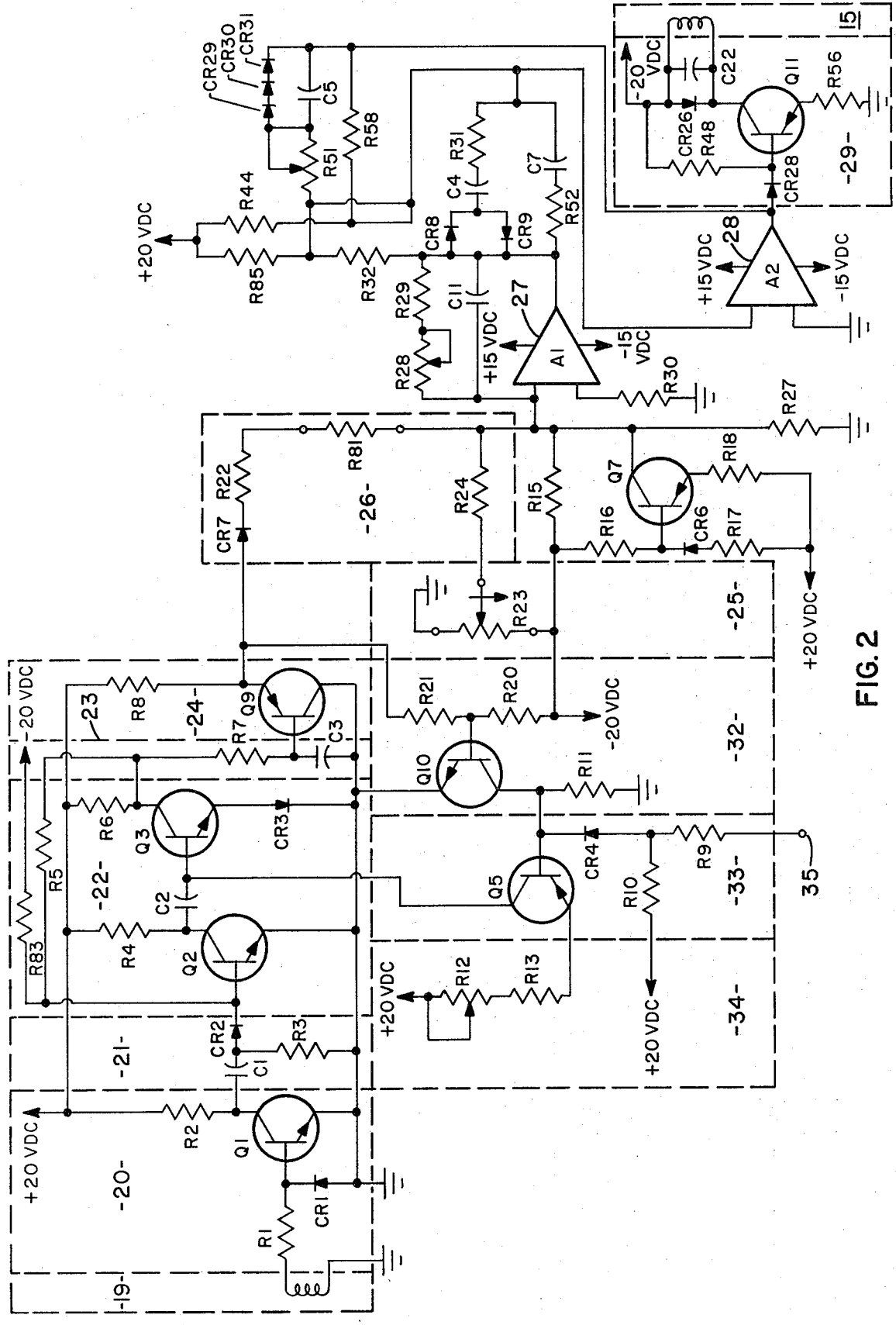
FIG. 2 is a schematic electrical diagram illustrating a preferred embodiment of an electronic control for accomplishing the invention.

Referring to FIG. 2, there is illustrated schematically an electronic circuit embodying the functions previously described. Speed sensor 19 is connected to the input of amplifier/wave shaper 20 which employs transistor Q1 to provide an essentially amplified square wave signal at the junction of its collector with capacitor C1. Capacitor C1 and resistor R3 form a differentiator circuit 21 which provides a series of spikes corresponding with the speed signal frequency at the base of transistor Q2.

Transistors Q2 and Q3 and associated components form a monostable multivibrator 22. When Q2 is off, a positive spike from integrator 21 causes transistor Q2 to begin to conduct which begins to turn off transistor Q3 by decreasing its base voltage. When transistor Q3 begins to turn off, its collector voltage rises which causes the base voltage on transistor Q2 to rise to further turn it on. The output voltage at the collector of transistor Q3 rapidly rises to produce a positive output voltage for the period of time that transistor Q3 is turned off. When transistor Q3 is turned off, current is supplied from transistor Q5 of current source 33 to capacitor C2 to raise the base voltage on Q3, causing transistor Q3 to conduct again and to turn off transistor Q2. The length of time that transistor Q3 is turned off is determined by the magnitude of the current supplied from current source 33 and the size of capacitor C2. Potentiometer R12 provides one means of adjusting the current supplied by current source 33 and serves as a means for adjusting the range of turbine speeds over which the control is normally adapted to operate due to the input frequency response of the multivibrator by adjusting the normal duration of the output pulses from transistor Q3.

Capacitor C3 and resistor R7 form an integrating network 23, the output of which is supplied to the base of transistor Q9 which forms an emitter follower buffer stage 24. The control signal output from buffer 24 passes through CR7, R22 and R31 to the input of operational amplifier 27.

A setpoint signal is generated by potentiometer R23, which provides a voltage proportional to a desired turbine speed and of opposite polarity to the control signal output from transistor Q9. This setpoint signal is summed with the control signal output of transistor Q9 at the input of operational amplifier 27 to provide an error signal for adjusting actuator 15 in a direction to speed up or slow down the turbine as desired. The error signal then passes through operational amplifier 28 and a current amplifier 29 comprising transistor Q11 from which the signal is supplied to actuator 15.

A process signal input 35 is provided which varies the base voltage on transistor Q5, and thereby the current output of current amplifier 33 to also control the speed of the turbine by adjusting the duration of the output pulses from multivibrator 22 in accordance with the desired condition of operation of the system.

In accordance with this invention, a feedback signal from the output of transistor Q9 passes through resistor R21 to a level detector stage 32 comprising transistor Q10. When the level of the control signal output from transistor Q9 is sufficient to turn on transistor Q10, indicative of a high turbine speed, the base voltage on Q5 will be decreased, causing greater current through transistor Q5 and a reduction in the pulse width duration of the multivibrator output. Consequently, the feedback signal has the effect of decreasing the output pulse duration from multivibrator 22 so that it can respond to a higher frequency of input pulses without giving a false output characteristic indicative of a lower than actual turbine speed.

The effect of the pulse duration variation produced by level detector amplifier circuit 32 is to produce a variation in the output pulse duration of multivibrator 22. It will be apparent that while this variation expands the range of input frequencies to which the multivibrator can usefully respond, it also results in decreased regulation of the turbine speed. This effect is not important since the range adjustment will normally have previously been set so that the decreased regulation occurs only when the turbine speed is substantially above the desired range of operating speed. While the control is no longer a reliable indicator of the speed of the turbine, it does provide a maximum error signal indicative of the need to immediately reduce the turbine speed. When the turbine speed has been reduced sufficiently, the control is enabled to take over again to provide the setpoint speed desired. The important advantage of this feedback arrangement lies in the fact that an excessively high turbine speed never produces an output signal from the multivibrator indicating that the turbine is operating at a lower speed than its actual speed. Consequently, the control is always capable of bringing the turbine back to the desired setpoint speed.

Typical component values for the circuit of FIG. 2 are given in the chart below:

| SYMBOL | DESCRIPTION OR DRAWING NO. |
| --- | --- |
| 27, 28 | µA741 |
| C1 | 50 pf/1000V |
| C2 | 0.0015 mf/1000V |
| C3 | 0.2 mf/20V |
| C4 | 150 mf/6V |
| C5 | 330 mf/6V |
| C7 | 0.68 mf/35V |
| C11 | 0.1 mf/10V |
| C22 | 0.01 mf/600V |
| CR1-CR9 | 1N914 |
| CR26, CR28 | 1N914 |
| CR29-CR31 | 1N914 |
| Q1, Q2, Q10 | 2N5088 |
| Q3 | 2N5249A |
| Q5, Q7, Q9 | 2N4250 |
| Q11 | 2N3906 |
| R1, R2, R8 & R14 | 10K ±5% ¼W |
| R3 | 68K ±5% ¼W |
| R4 | 2K ±5% ¼W |
| R5, R20, R31, & R48 | 100K ±5% ¼W |
| R6 | 3.9K ±5% ¼W |
| R7, R52 | 39K ±5% ¼W |
| R11 | 200K ±5% ¼W |
| R13 | 5.1K ±5% ¼W |
| R21 | 56K ±5% ¼W |
| R29 | 43K ±5% ¼W |
| R30 | 6.8K ±5% ¼W |
| R32 | 390K ±5% ½W |
| R56 | 56Ω ±5% ¼W |
| R58 | 130K ±5% ¼W |
| R81 | 7680 ±1% ¼W |
| R9, R10 | 4990 ±1% ¼W |
| R22 | 7320 ±1% ¼W |
| R24 | 51.1K ±1% ¼W |
| R27 | 40.2K ±1% ¼W |
| R47 | 8450 ±1% ¼W |
| R62 | 80.6 ±1% ¼W |
| R17 | 20.0K ±1% ¼W |
| R15 | 15.8K ±1% ¼W |
| R16 | 60.4K ±1% ¼W |
| R18 | 9760 ±1% ¼W |
| R12 | 100K ±10% ¾W |
| R28 | 250K ±10% ¾W |
| R51 | 20K ±10% ¾W |
| R44 | 2.7M ±5% ½W |
| R85 | 10M ±5% ½W |

While it is preferred to extend the useful high range of operating speeds of the control by shortening the duration of the output pulses from the multivibrator, it will be apparent that it is feasible to continuously vary the duration of the output pulses from the multivibrator as a function of turbine speed over the entire operating range, if desired, instead of providing the threshold which results from inserting level detector 32 in the feedback network.

It is preferred to provide a feedback signal from the output of buffer 24 to current source 33, but it is possible to employ a feedback signal from any source in the control circuit capable of providing a signal which is a function of the speed of turbine 10. For example, the feedback signal may be a suitable function of the output amplifier/wave shaper 20. Consequently, as used herein, the term feedback signal refers to any signal capable of varying the current supplied from current source 33 to multivibrator 22 which is a function of the speed of turbine 10 and includes a feed forward signal.

It will also be apparent that various other types of variable speed machinery using electropneumatic, hydraulic or electric actuators may be controlled in accordance with this invention by varying the duration of the output pulse from a monostable multivibrator in accordance with the speed being sensed to expand the effective operating frequency range of the multivibrator control.

Accordingly, this invention may be otherwise embodied within the scope of the following claims.

We claim:

1. A speed control system for a machine comprising:

A. sensing means for sensing a speed of operation associated with said machine and providing a speed signal having a frequency which is a function thereof;

B a monostable multivibrator responsive to said speed signal for providing an output signal comprising pulses at a frequency which is a function of the frequency of said speed signal;

(C) integrating means for integrating the output signal from the said multivibrator to provide a control signal which is a function thereof;

(D) setpoint means for generating a setpoint signal corresponding with a desired speed of operation of said machine;

(E) actuating means for adjusting the speed of operation of said machine in response to a function of an error signal functionally related to the control signal output provided from the integrating means;

(F) current source means for providing a current to the multivibrator of a magnitude which determines the duration of the output pulses therefrom; and (G) feedback circuit means for supplying a feedback signal which is functionally related to the speed of said machine, to the current source means to vary the current provided to the multivibrator to thereby vary the duration of the output pulses produced by the multivibrator during at least high speed operation of the machine.

2. A speed control system as defined in claim 1 wherein said feedback circuit means includes a level detector for transmitting only feedback signals of a predetermined threshold magnitude to the current source means, said predetermined threshold magnitude feedback signal being indicative of a relatively high speed of operation of said machine; and wherein said current source means includes a circuitry for varying the current supplied to the multivibrator in a direction to reduce the duration of the output pulses therefrom when the feedback signal exceeds said predetermined threshold magnitude.

3. A speed control system as defined in claim 1 wherein said setpoint means includes means for supplying a process setpoint control signal to the current source; and wherein said current source includes circuitry for varying the current supplied to the multivibrator in response to the process signal input in a manner so as to vary the duration of the output pulses from the multivibrator to thereby vary the speed of operation of said machine in accordance with the process setpoint control signal input to the control.

4. A speed control system as defined in claim 1 including summing means for summing a setpoint signal with a function of the output signal from the multivibrator to provide an error signal for adjusting said actuating means, said circuit further including means for supplying a process setpoint control signal to the current source; and wherein said current source includes circuitry for varying the current supplied to the multivibrator in response to the process signal input in a manner so as to vary the duration of the output pulses from the multivibrator to thereby vary the speed of operation of said machine in accordance with the process setpoint control signal input to the control.

5. A speed control system for a fluid turbine comprising:

A. sensing means for sensing a speed of rotation associated with the turbine and providing a speed signal having a frequency which is a function thereof;

B. a monostable multivibrator responsive to the speed signal for providing an output signal comprising output pulses of normally constant duration at a frequency which is a function of the frequency of the speed signal frequency;

C. integrating means for integrating the output signal from the multivibrator to provide a control signal which is a function thereof;

D. setpoint means for generating a setpoint signal corresponding with a desired speed of operation of said turbine;

E. summing circuit means for summing the setpoint signal with the control signal from said integrating means to provide an error signal;

F. actuating means for controlling the fluid flow through said turbine in response to a function of the error signal provided from said summing means;

G. current source means for providing a current to the multivibrator of a magnitude which determines the duration of the output pulses therefrom;

H. feedback circuit means for providing a feedback signal to said current source means which is functionally related to the sensed speed of the turbine, said feedback circuit means including a level detector circuit for transmitting only feedback signals corresponding to a relatively high turbine speed to said current source means; and I. said current source means including circuitry for varying the current supplied to the multivibrator in a manner to reduce the duration of the output pulses from the multivibrator upon the passage of a feedback signal corresponding to a relatively high turbine speed to said current source.

6. A speed control for a fluid turbine as defined in claim 5 wherein said setpoint means further includes means for supplying an externally generated process signal to the current source; and wherein said current source includes circuitry for varying the current supplied to the multivibrator in response to the process signal input in a manner so as to vary the duration of the output pulses from the multivibrator to thereby vary the speed of operation of said machine in accordance with the process signal input to the control.

7. A method of controlling the speed of a fluid turbine comprising the steps of:

A. sensing a speed functionally related to the speed of rotation of the turbine and providing a speed signal which has a frequency which is a function thereof;

B. supplying current to a monostable multivibrator and triggering the multivibrator with said speed signal to produce output pulses corresponding with a function of the frequency of said speed signal and having a duration corresponding with the magnitude of current supplid to themultivibrator;

C. integrating the output pulses fro the multivibrator to obtain a control signal;

D. generating a setpoint signal which is a function of desired speed of operation of said turbine;

E. modifying the control signal with the setpoint signal to obtain an error signal which is a function of the desired change in fluid flow through theturbine;

F. varying the fluid flow through the turbine in accordance with a function of the error signal to obtain a desired speed of operation of the turbine; and G. varying the duration of the output pulses from the multivibrator by varying the current supplied thereto in accordance with a function of the sensed speed of said thrbine to extend the range of input frequencies to which the multivibrator can usefully respond.

8. A method of controlling the speed of a fluid turbine as defined in laim 7 wherein the step of modifying the control signal includes varying the duration of th output pulses from the multivibrator by varying the current supplied thereto in accordance with a function of a setpoint control signal.

9. A method of controlling the speed of a fluid turbine as defined in claim 7 wherein the step of modifying the control signal with the setpoint signal comprises summing a control signal with the setpoint signal to prvide said error signal and varying the duration of the output pulses from the multivibrator by varying the current supplied thereto in accordance with a function of another setpoint control signal.

* * * * *